(12) United States Patent
Raghoebardayal (10) Patent No.: US 9,135,753 B2
(45) Date of Patent: Sep. 15, 2015

(54) APPARATUS AND METHOD OF AUGMENTED REALITY INTERACTION

(71) Applicant: Sony Computer Entertainment Europe Limited, London (GB)

(72) Inventor: Sharwin Winesh Raghoebardayal, London (GB)

(73) Assignee: Sony Computer Entertainment Europe Limited (GB)

( * ) Notice: Subject to any disclaimer, the term of this patent is extended or adjusted under 35 U.S.C. 154(b) by 197 days.

(21) Appl. No.: 13/781,974

(22) Filed: Mar. 1, 2013

(65) Prior Publication Data

US 2013/0249944 A1 Sep. 26, 2013

(30) Foreign Application Priority Data

Mar. 21, 2012 (GB) .................................. 1204967.2

(51) Int. Cl.
*G06T 19/00* (2011.01)
(52) U.S. Cl.
CPC ..................................... *G06T 19/006* (2013.01)
(58) Field of Classification Search
CPC ....... G06T 19/006; G06T 19/00; G06F 3/011; G06F 3/012; G06F 3/0304
USPC .................................. 345/629–633; 715/757
See application file for complete search history.

(56) References Cited

U.S. PATENT DOCUMENTS

| 8,427,506 | B2 * | 4/2013 | Kato ............................. | 345/632 |
| 2007/0211071 | A1 * | 9/2007 | Slotznick et al. ............. | 345/594 |
| 2008/0219502 | A1 * | 9/2008 | Shamaie ....................... | 382/103 |
| 2011/0033086 | A1 * | 2/2011 | Kubota ......................... | 382/103 |
| 2011/0080490 | A1 * | 4/2011 | Clarkson et al. ........... | 348/222.1 |
| 2012/0113140 | A1 | 5/2012 | Hilliges et al. | |
| 2013/0002708 | A1 * | 1/2013 | Raffle et al. .................. | 345/619 |

OTHER PUBLICATIONS

Buchmann et al., "FingARtips: gesture based direct manipulation in Augmented Reality", Proceedings of the 2nd international conference on computer graphics and interactive techniques in Australia and South East Asia (GRAPHITE '04), 2004, pp. 212-221.
Examination Report from Great Britain for Application No. GB1204967.2 dated Jul. 11, 2012.
Piumsomboon et al., "Poster: Physically-based natural hand and tangible AR interaction for face-to-face collaboration on a tabletop", 2012 IEEE Symposium on 3D User Interfaces, pp. 155-156, Mar. 4-5, 2012. Available from <http://ieeexplore.ieee.org/stamp/stamp.jsp?tp=&arnumber=6184208&isnumber=6184165>.
Search Report from Great Britain for Application GB1204967.2 dated Jul. 6, 2012.

* cited by examiner

*Primary Examiner* — Todd Buttram
(74) *Attorney, Agent, or Firm* — Lerner, David, Littenberg, Krumholz & Mentlik, LLP (57) ABSTRACT

A method of augmented reality interaction for repositioning a virtual object on an image of a surface comprises capturing successive video images of the surface and first and second control objects and defining an interaction start area over the surface with respect to the virtual object. The method detects the control objects in successive video images, detects whether the control objects are brought together over the interaction start area, and if so, analyzes a region of successive video images using optical flow analysis to determine the overall direction of motion of the control objects and augmenting the video image to show the virtual object being held by the control objects. Augmenting the video image itself comprises superposing a graphical effect on the video image prior to superposition of the virtual object, such that the graphical effect visually disconnects the virtual object from the video image in the resulting augmented image.

12 Claims, 7 Drawing Sheets

APPARATUS AND METHOD OF AUGMENTED REALITY INTERACTION

CROSS REFERENCE TO RELATED APPLICATIONS

The present application claims the benefit of and priority to GB Application No. 1204967.2, filed Mar. 21, 2012, the entire disclosure of which is incorporated by reference herein.

BACKGROUND OF THE INVENTION

1. Field of the Invention

The present invention relates to an apparatus and method of augmented reality interaction.

2. Description of the Prior Art

Typical augmented reality (or 'AR') applications or systems receive live or recorded video images of a real environment, and then augment these video images with computer graphics in such a way that the computer graphics appear to move or be positioned in a manner consistent with the movement or position of the real environment in the video images.

The effect is to insert the computer graphics (or 'virtual objects') into the real environment in a consistent and believable way. Preferably this is done in real time; that is to say, the generation and augmentation of the video is performed at normal video frame rates. A good example of this can be seen in the game 'Eye Pet'® for the Sony® PlayStation 3® or 'PS3'®.

Most AR applications or systems achieve this by making use of a real object in the environment whose appearance and dimensions are known and in advance encoding the appearance and dimensions of this object as a reference model in a computer. By comparing the scale and orientation of this object as found in the video images with the reference model, it is possible for the computer to calculate the corresponding scale and orientation that should be applied to virtual objects used to augment the image.

Figure 1:
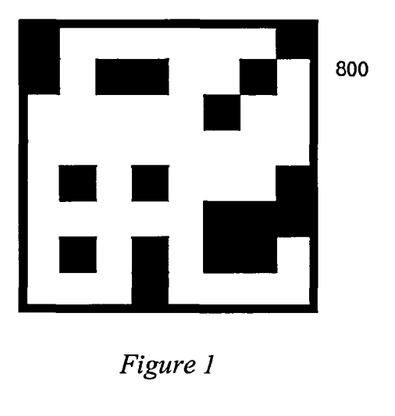
FIG. 1 is a schematic diagram of a fiduciary marker according to an embodiment of the present invention.

To improve the reliability of this process in adverse lighting conditions, or where the video camera in use has a low resolution, often the real object used is a so-called fiduciary marker 800, an example of which is shown in FIG. 1. Such markers typically have a high contrast border and patterning to improve robustness to lighting, and the pattern is typically asymmetric to help resolve the orientation of the marker.

Often, in order to maintain the illusion of the augmented reality environment, a virtual object added to the video image is positioned over the fiduciary marker in the video image so that it is not visible in the augmented image. This improves the aesthetic of the resulting augmented images, but means that if a user wishes to interact with the virtual object (or example stroking a virtual pet), there is a significant risk that they will occlude the fiduciary marker as they will be gesturing within the real space close to it. Depending on the extent to which the marker is occluded in this manner, the application or system may lose the ability to identify the marker and/or accurately determine its scale or orientation, making realistic augmentation of the video images difficult and resulting in the graphical objects moving unnaturally with respect to the background video, spoiling the AR effect. As this tends to occur just as the user is attempting to interact with the object, the effect can be very frustrating, particularly for younger users.

Consequently there is scope to improve means by which users can interact with virtual objects that overlie fiduciary markers.

SUMMARY OF THE INVENTION

In a first aspect a method of augmented reality interaction is provided in accordance with claim 1.

In another aspect, an entertainment device is provided in accordance with claim 15.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

An apparatus and method of augmented reality interaction are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

As noted above, the Sony® PS3® is a suitable apparatus or entertainment device for implementing augmented reality, typically when connected to a suitable video camera such as the EyeToy, and when operating under suitable software control.

Figure 2:
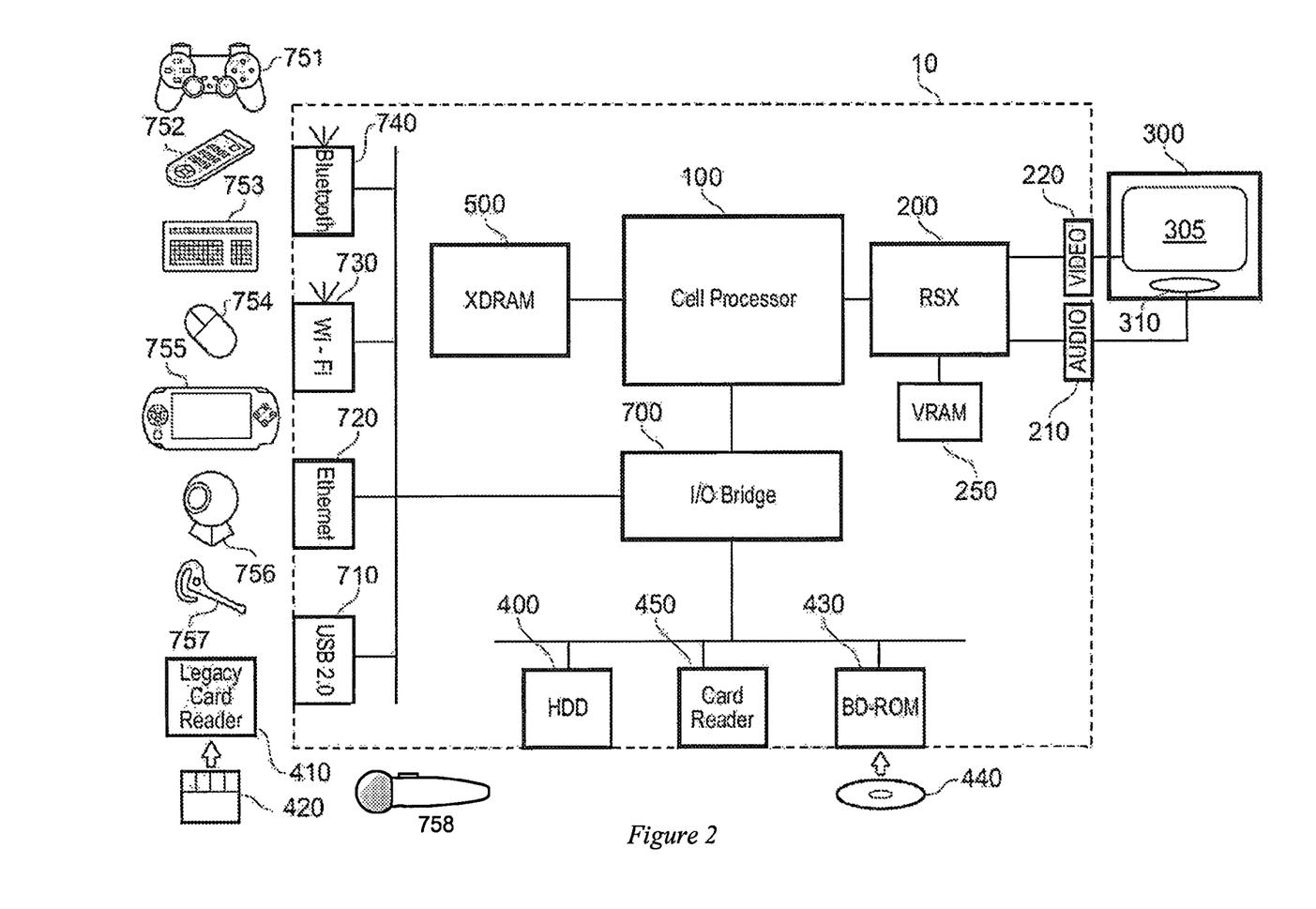
FIG. 2 is a schematic diagram of an entertainment device according to an embodiment of the present invention.

FIG. 3 schematically illustrates the overall system architecture of a suitable entertainment device known as the Sony® Playstation 3® entertainment device or PS3@. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In embodiments of the video camera, it is stereoscopic. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 3A:
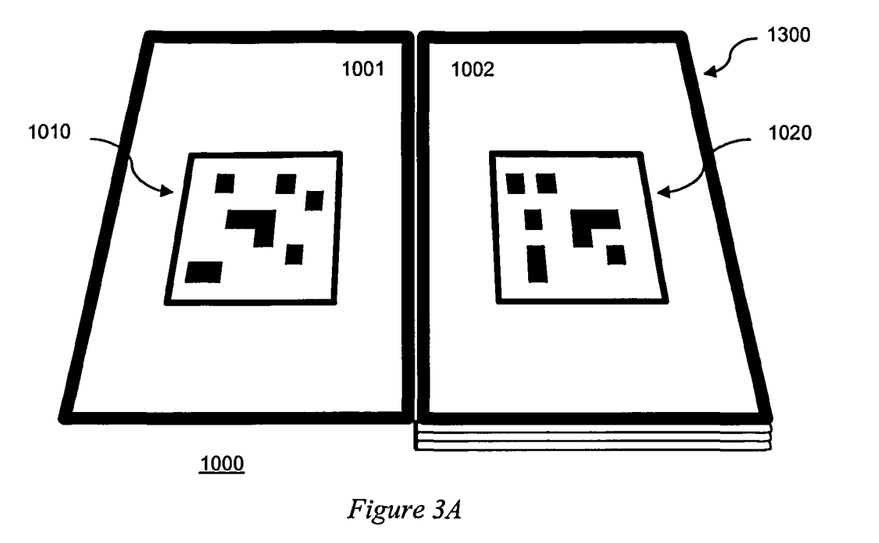
FIG. 3A is a schematic diagram of a book comprising fiduciary markers according to an embodiment of the present invention.
Figure 3B:
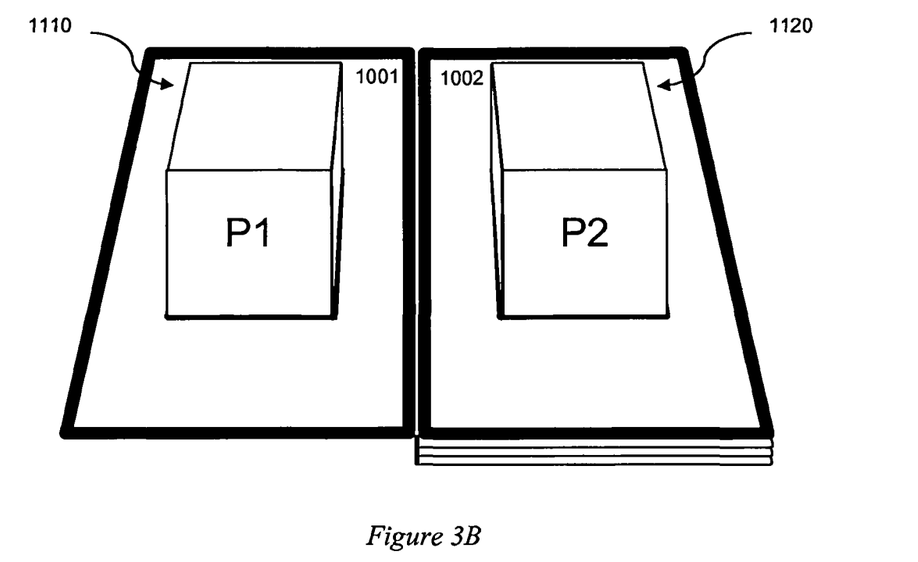
FIG. 3B is a schematic diagram of an image of the book augmented by graphical objects, according to an embodiment of the present invention.

Turning now to FIGS. 3A and 3B, in an embodiment of the present invention the PS3 is arranged in operation to augment video images of a book 1000. The book may for example be an A4 or A5 (210×297 mm or 210×148 mm) sized board book, though any size of book may be envisaged.

The book comprises at least one rigid, turnable leaf (thus forming a so-called 'board book'), and comprises fiduciary markings on some or all of the pages 1010, 1020, as shown in FIG. 3A. A leaf will be understood to be a single turnable sheet or panel of a book and typically comprises a page on each side.

FIGS. 3A and 3B show by way of example pages 1 and 2 of such a book, labelled 1001 and 1002 respectively. Optionally the inside front and/or back covers of the book may also act as pages and comprise fiduciary markings. Similarly, optionally the outside front and/or back covers may comprise fiduciary markings. In addition, optionally each page is edged with a high contrast marking 1300 to facilitate detection of the extent of the page.

The markings on a page comprises a pattern that serves to identify the page. Typically the pattern will be unique to a page, or the combination of patterns on opposing pages will be unique to that pairing of pages, enabling identification of which page or pages the book is currently opened to.

In use, the open book may be placed on a surface, or placed on a user's lap or held in their hands, and the PS3 and video camera can then capture an image of the book (typically together with some surroundings) and use known techniques to detect the fiduciary markings on each visible page and hence identify those pages of the book and estimate their positions. Given this information, the PS3 can augment the captured video image of the book with an augmentation layer of computer graphics, such as pop-up virtual graphic objects 1110, 1120, which correspond to the placement, scale and orientation of the fiduciary markings 1010, 1020 on the visible pages as shown in FIG. 3B. The PS3 can then output the augmented video image for display. In this way the displayed version of the book becomes a 'magic' pop-up book in which the pages can come to life.

On many of these pages, it can be expected that graphical characters may act out a story, and require a user to interact with them. For example, in an interactive version of the well-known story of the three little pigs, a user may be asked on successive pages to gather straw, wood or bricks for the pig character on the respective page to use to build a house.

As such, in a typical usage the pages of the book can be treated as a series of surfaces for augmented reality play.

Consequently, it can be expected that the or each fiduciary marker on the visible pages of the book will frequently be at least partially occluded by the user's hands as such interactions occur. As noted above, such occlusion can interfere with the subsequent positioning and orientation of the virtual objects.

In order to mitigate this, in an embodiment of the present invention the book may comprise one or more of the following features.

Firstly, the fiduciary markers may occupy a large proportion of each page; for example between 50% and 95% of each page. Alternatively or in addition, each fiduciary marker comprises spatial redundancy, being uniquely identifiable both overall and also from one or more sub-regions.

In combination with the page size (e.g. for an A4 or A5 sized book) this makes it less likely that a user's hands will occlude a sufficient amount of the or each fiduciary marker to prevent recognition when the book is open.

Secondly, as noted above the pages of the book may comprise clear border markings 1300, to provide contrast between a page of the book and its surroundings. Consequently, in operation the PS3 can initially identify a page from the fiduciary marker patterns, but then also track the scale and orientation of the page from the border markings. Consequently if the fiduciary marker pattern on the page is occluded to the extent that it can no longer be recognised, the PS3 can continue to track any visible borders of the page in order to estimate the scale and orientation of the book. For example, it may be possible to provide a reasonable approximation of the current page position and orientation, if the PS3 can identify just two corners of the page or equivalently the ends of the border on one side of the page. This can be done by assuming that the scale and orientation of the book will not change significantly on a per frame basis, allowing a simpler tracking scheme to modify the scale and orientation previously established more robustly using the recognised marker. Similarly, when unable to recognise a marker the PS3 can assume that a page has not changed unless the orientation of the page border changes in a manner suggestive of the page being turned.

In a related manner, the fiduciary markings on a page may comprise different functional elements on different parts of the page. For example, the patterning to identify the page number may be located near the middle of the page, whilst patterning particularly suited to resolving scale and orientation may be positioned near each corner of the page.

Thirdly, the colouring of the book can be chosen to improve discrimination between the book and a user's skin tone, to reduce the amount of the book image that is discarded during analysis. For example, the book may have a light blue background, with fiduciary markings in a darker blue.

The captured video image can then be filtered aggressively to identify flesh tones, which for almost all users will contain a threshold red to green or red to blue ratio that will be higher than that in the book. This allows for more accurate segmentation of the user's hands and arms from the book in the video image, so preserving more of the book image for analysis. In addition, by using light and dark blue (or light and dark green) for the marker patterns, the brightness of the image can be normalised whilst maintaining the distinction between skin tone and background, which further mitigates against shadows of the user's hands and arms affecting the image of the book.

In an alternative colouring scheme, the background of the book can be green or blue, and the pattern can be blue or green (i.e. the opposite colour); in addition to still enabling aggressive skin-tone filtering, this enables the patterns on the page to be separately distinguished in both the green and blue colour channels. This may be beneficial when the book is being illuminated by coloured light (as may well be the case if the book is placed near a TV during use).

Whilst the above techniques mitigate against problems of occlusion of the markers, it is also desirable to provide methods of interaction with the book for use by the user that are more robust in such circumstances whilst also unlikely to be accidentally triggered. In particular, it is desired to provide a method of interaction that enables a user to pick a virtual object up off the book's surface, and position it elsewhere on the surface.

In an embodiment of the present invention, the gesture used to pick up such an object comprises a user bringing their hands together under the virtual object to cup it, and then move their cupped hands to move the object to a new position. Such an action is unlikely to be accidentally performed, and additionally, the requirement to move both hands means that occlusion of any one part of the book is unlikely to last for long, so improving error robustness.

An interaction method for picking up a virtual object in this manner from the book's surface comprises firstly defining a starting area on the book surface. The starting area will typically but not necessarily overlie the location of the virtual object to be picked up.

The starting area may be a single area, or may be comprised of two adjoining or overlapping areas. Such areas may be thought of as virtual buttons.

In an embodiment of the present invention, virtual buttons are input regions monitored by the PS3 for evidence of interaction, for example by the presence of the user's hand (as detected from the skin tone filtering described previously) or from specific motion of the user's detected hand.

Optionally to provide consistency of input independent of the position and orientation of the book, the virtual buttons are internally represented by the PS3 as predefined 2D areas, which are then projected or mapped onto the book according to the currently calculated position, scale and orientation of the book. The detected user inputs within these projected areas are then back-projected (i.e. reverse-mapped) to the 2D space, so that the user's interaction with the virtual button can be evaluated in a manner invariant to scale and orientation by analysis of the reverse-mapped inputs.

The virtual button itself may comprise or be associated with a graphical element (so that the button is visible in the augmented image) or may not, so that it is simply treated as an input area overlying the augmented image.

Figure 4:
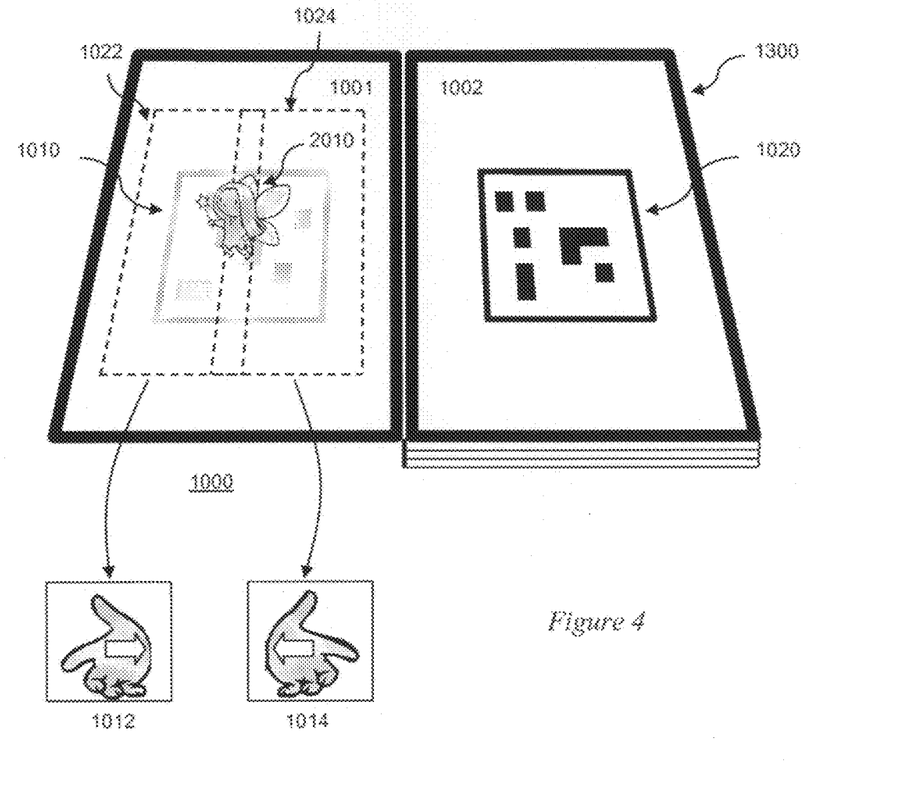
FIG. 4 is a schematic diagram of an analysis region for an image of the book, according to an embodiment of the present invention.

Referring now to FIG. 4, in an embodiment of the present invention two virtual buttons 1012, 1014 are mapped to adjacent or partially overlapping areas of the book 1022, 1024 (these areas are shown partially overlapping in FIG. 4). In this example, the areas coincide with a pre-set position for a virtual object 2010. It will be appreciated that the buttons may map to pre-set positions, or may be mapped to track the position of virtual objects, depending on a designer's requirements.

As noted above, the gesture used to interact with the virtual object 2000 is to cup it by bringing the user's hands together.

The user's hands (for example) are detected as skin pixels in the captured video image (or a region thereof) having a threshold ratio of red to blue or red to green (depending on the book's physical colour scheme), and the skin pixels coinciding with the projected area of each button in the augmented image layer are reverse-mapped to the PS3's internal 2D representation as described above.

For successive video frames, movement of the user's hands in these internal representations of the buttons is detected using known techniques. The PS3 then detects whether the movement for each button is consistent with the user's hands coming together. For example, if the movement in the left button is to the right, and the movement in the right button is to the left. In addition, the PS3 detects whether the hands have substantially met by analysing the position of the hand for each button. Depending on the implementation used, if for each button, skin pixels occupy a threshold percentage of a region of the internal presentation of the button at or near the edge of the button that is adjacent to or overlaps the other button in the starting area, then the user's hands are deemed to have met.

When both the motion and positioning criteria are met, the virtual object pick-up can be initialised.

Where the start area comprises one button, it will be appreciated that the analysis of the inputs to this one button may be similar, but treating the vertical mid-line of the internal representation area as similar to the adjacent or overlapping edges of the two buttons described above.

It will be appreciated that whilst the above description referred to reverse-mapping inputs, any suitable means of detecting user's hand motion and positioning may be considered. For example, a user may bring together two Playstation Move® controllers in the start area, to indicate a desire to pick up the virtual object.

Hence more generally the system detects the bringing together of a first and second control object, those objects being either items such as a Move controller, or the user's hands or parts thereof (see below).

It will also be appreciated that whilst the starting area has been described as overlying the virtual object or being substantially centred upon it, this may not necessarily be the case; for example the user may cup their hands near to the virtual object which may then jump into the users hands; similarly the user may bring their hands together and then move a virtual object using a shoveling action towards it.

It will also be appreciated that the precise timing and symmetry of position and movement of the user's hands may be made subject to a level of tolerance. Thus for example the size of the region of the button used to determine when the hands are together may be adjusted to provide suitable positional tolerance, and similarly in order to trigger the object pick-up process a predetermined period of time may be provided after inputs to one button satisfies the criteria in which inputs to the other button can satisfy the criteria. Typically this time period may be a value in a range equivalent to between one and 30 frames of captured video.

Once triggered, the virtual object pick-up process proceeds as follows.

Figure 5:
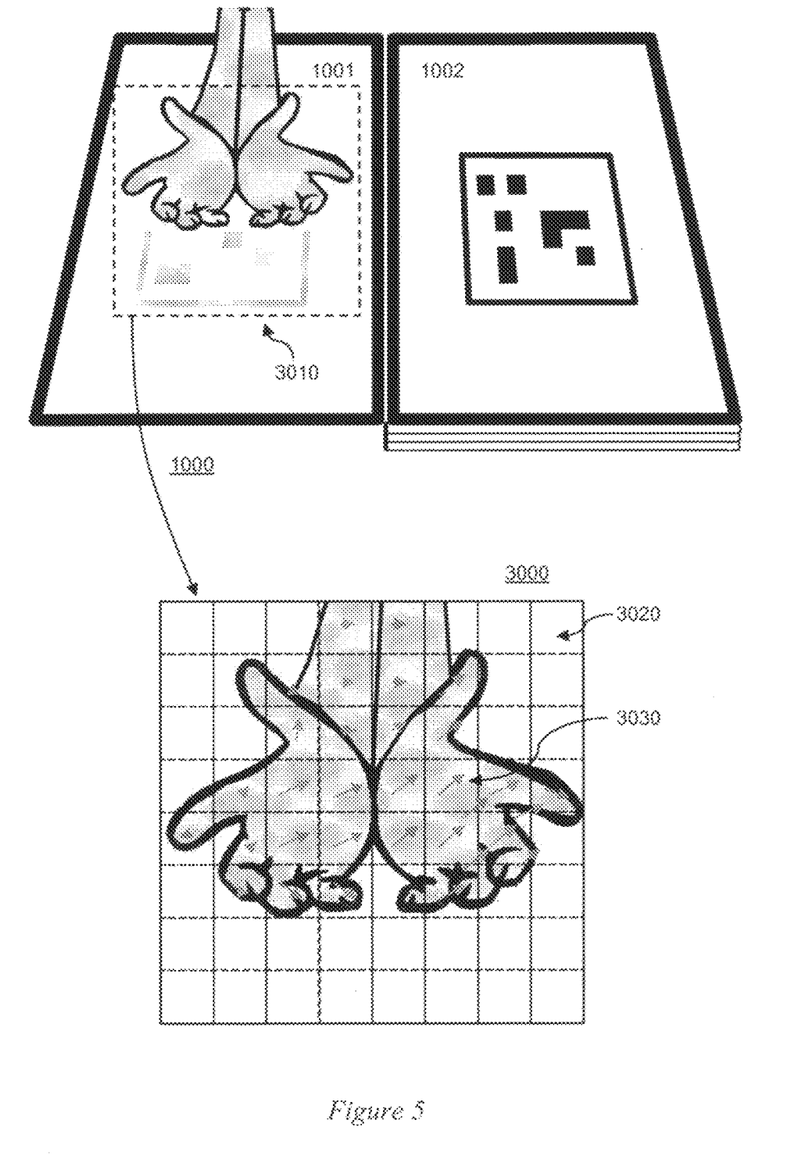
FIG. 5 is a schematic diagram of an analysis region for an image of the book, according to an embodiment of the present invention.

Referring now to FIG. 5, the PS3 starts copying (for example by so-called 'Mining') an area 3010 of successive input video images. This copied area may initially correspond directly to the start area, or may be larger. For example, it may extend laterally by 25% and vertically by 50%. The copy of the area is placed in a separate buffer 3000.

In this way, the buffer 3000 effectively becomes a copy of a sub-region 3010 of the video image, and may then be analysed.

In an embodiment of the present invention, the sub-region of the video image copied to the buffer is subjected to so-called optical flow analysis, which enables an estimate of planar motion within the sub-region of the video image, for example at a granularity of 8×8 or 16×16 pixels (i.e. by dividing the subregion into 8×8 or 16×16 blocks 3020, each of which is tested for motion).

Any suitable optical flow technique may be used for this analysis, such as so-called phase-correlation based optical flow analysis, in which the relative displacement (and hence motion) of a segment of image under analysis is determined using the Fourier shift theorem; two images that are circularly shifted will generate 2D Fourier transforms that are phase shifted by a corresponding amount. The inverse FFT of a normalised cross power spectrum of these Fourier transforms then identifies the (x,y) peak correspondence that accounts for the apparent movement. This approach is more computationally efficient than a brute-force cross-correlation of successive image regions, but of course such cross correlation techniques are also envisaged within the scope of the embodiment.

It will be appreciated that such optical flow techniques are also suitable for detecting whether the user's hands form the cupping gesture in the first place, as described previously.

Notably, because the speed at which user may move their cupped hands may change over time, the optical flow sensitivity can be adjusted by changing the scale/size of the copied sub-region of the video image in the buffer. For example, copying only a small rectangular area to the buffer will result in greater apparent difference between successive images in the buffer when an object is moving. However, since too great a difference (e.g. movement going outside the optical flow window) breaks most optical flow systems, it is possible to change the scale or size of the area copied to the buffer responsive to the detected speed of movement, so that the copied image contains a different subset of the main video image as a function of user's hand motion.

Hence more generally the scale or size of the image region copied to the analysis buffer is responsive to the detected motion of objects in the preceding optical flow analysis.

It will also be appreciated that the sub-region of the video image that is copied to the buffer will move in accordance with the net detected motion, so as to track the user's hand(s) as they move within the captured video.

Optionally, the optical flow output is filtered so that calculated motion vectors 3030 for regions not likely to be skin are set to zero. Such filtering can improve the performance of the system in situations were other elements of the background image are moving.

For example, motion vectors are reset for a block of pixels if less than a threshold number of pixels in it are classified as skin pixels, or similarly if less than a threshold probability of skin pixels in the block is estimated, using known techniques. Alternatively, it will also be appreciated that for suitable optical flow techniques, it would be possible to apply optical flow analysis only those blocks of the sub-region in the buffer satisfying such a skin criterion in the first place.

The above skin criterion thresholds can be set to allow a high level of tolerance for skin tones, as can the technique chosen to classify or otherwise assess the pixels as skin pixels.

It will be appreciated that whilst individual blocks within the buffer image are analysed for their own optical flow and resultant motion vector, the overall motion of the cupped hands is expected to be a single net motion in a particular direction, because each hand is a unitary object (and the gesture of cupping the hands further makes them a single combined object).

To capture this overall motion, so-called blob-tracking can be used based on a larger area within the buffer image, such as the identified skin pixels, or a contiguous set of identified pixels, or a square box bounding a percentage of identified skin pixels (for example a percentage in the range from 25%-95%). The net motion of this blob can be estimated from the mean of the motion vectors of blocks overlapping this blob region. Hence the blob tracking step estimates the gross movement of the user's hands.

In a similar manner, alternatively the motion vectors for the blocks (or a selected subset thereof) can be averaged together to estimate the gross motion of the user's hands.

Alternatively or in addition to either of the above approaches, optionally the net motion from the motion vectors of the blocks or a subset thereof (either unfiltered, skin-filtered or blob-tracked as appropriate) is smoothed or time-averaged to remove any residual jitter arising from random errors in the optical flow estimates. Notably however such smoothing can make the motion estimate appear unresponsive or slow relative to the actual movement of the user's hand.

Alternatively or in addition, the resolution of the sub-region sent to the buffer image could be scaled up or down depending on the detected speed of movement at the previous frame. Hence one may use a high resolution but smaller absolute size sub-region for slow movement, and a low resolution but larger absolute size sub-region for fast movement. This allows for the fidelity of the tracking to scale inversely with speed, and also allows more for image margin when hands are moving fast.

Figure 6:
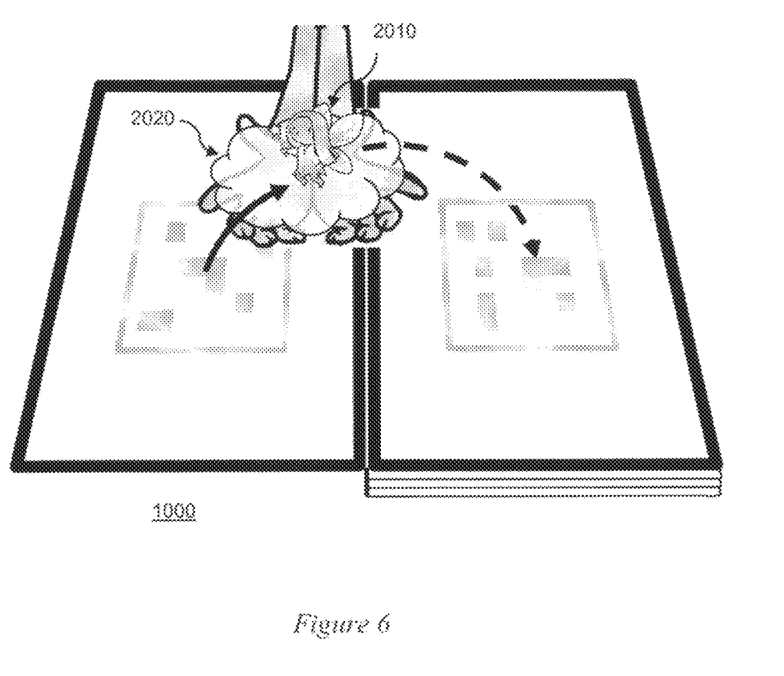
FIG. 6 is a schematic diagram of an image of the book augmented by graphical objects, according to an embodiment of the present invention.

Referring now to FIG. 6, the issue of jitter, or conversely the issue of averaging-induced delay in the estimate of the motion of the user's hands, can be mitigated during the manipulation of the virtual object 2010. In FIG. 6 the augmented image is shown, in which the virtual object is shown positioned with respect to the estimated position of the user's hand as determined using the optical flow system, but optionally in addition is shown resting on a cloud or similar graphical effect 2020 (such as a pattern of sparkles) that serves to visually decouple the virtual object from the user's hands, making errors and delays in the relative positions of the virtual object and the user's hands less obvious. The graphical effect can also serve to obscure the user's hand near the position of the virtual object, and may itself be animated to suggest a plausible visual cause for random relative motion between the virtual item and the user's hands (for example, the cloud may swirl around).

The graphical effect can visually decouple the virtual object from the user's hands by surrounding the virtual object in the augmented image, in front of the user's hands but notionally behind the virtual object, by at least a predetermined amount; for example by a predetermined number of pixels that is greater than or equal to the anticipated jitter or error in position estimation for the user's hands. Alternatively, the graphical effect (such as a swirling cloud) may be re-scaled to a size that is a predetermined proportion of the detected size of the user's hands in the captured image, such as (by way of a non-limiting example) 50% of the width of the two cupped hands, Alternatively, the graphical effect (such as a swirling cloud) may be re-scaled to a size that is substantially midway between the size of the displayed virtual object and the user's two cupped hands in the captured image.

Notably, in this arrangement, the user's hands may therefore appear to be both in front of some augmentation (such as a graphical overlay of the book) and behind other augmentation (such as the picked-up virtual object, and any cloud effect or similar).

This may be achieved by using the skin pixel detection to define a mask that is applied to a first augmentation layer, so that the augmentation layer is applied over pixels of the video image as appropriate except for pixels identified as skin pixels. The subjective effect is that the hands lie on top of this first augmentation layer. The virtual object and optional cloud effect then form a second augmentation layer that does not refer to the skin pixel mask, and consequently appears on top of the user's hands.

Finally, optionally the pick-up and carry process may be made subject to a time limit (such as a period in a non-limiting example ranging between 0.5 and 10 seconds), after which the virtual object either disappears from the user's hands and returns to the start position, or is animated to fall out of the user's hands onto the book. The purpose of the time limit is to reduce the chances of an optical flow tracking error occurring that would cause the estimate of the user's hand position to drift from the correct hand position, in turn causing the virtual object to appear to drift away from the user's hands.

Typically, the user will be asked to pick the virtual object up as part of a goal-oriented activity, such as to place the object in a specific place in order to progress a story. At other times it may simply be that the virtual object is one that can be interacted with freely in this fashion. For example, a virtual character acting as a book narrator may be animated to walk alongside words on the page, and a synchronised voice reads the words. Picking the narrator up and dropping him/her at different points on the page allows a user to skip or repeat parts of the spoken narration of the book.

Hence in addition to picking the virtual object up, the user can also drop or place the virtual object back onto the book.

In an embodiment of the present invention, the optical flow analysis as described above estimates the gross movement within the buffer image (either by averaging motion vectors from a plurality of blocks, or using blob analysis), but as an interim step estimates the gross movement in each of the left and right halves of the buffer image. If the horizontal motion in these two halves of the buffer image differs by more than a threshold amount, this is indicative that the user is separating their hands (i.e. in order to let the virtual object fall out).

At this point, the graphical effect used to visually decouple the hands in the video image from the motion of the virtual object tracking the hands can be removed (for example the cloud can be shown to dissipate) and the virtual object can be shown to fall between the user's hands.

Optionally the virtual object can be held in the user's hands until a gap between skin pixels near the centre of the buffer image is roughly the same size as the virtual object, so that the gap between the user's hands is of a plausible size to let the virtual object fall through.

To a first approximation, the virtual object can fall down to the same vertical position from which it was picked up, optionally corrected for any movement of the book whilst being carried in the user's hands. This implements a 2D or planar transfer of the virtual object.

To implement a 3D transfer of the virtual object (so that for example the object may be placed at the from or back of the book as well as to the left or right of the book), then a stereoscopic camera can be used to determine the distance of the user's hands and hence their z-axis position relative to the front or back of the open book.

Alternatively or in addition, the size of the user's hands may be estimated when they pick the virtual object up, and may be re-estimated when they drop the virtual object. The change in size will be indicative of the change in distance from the camera. Given information about the optics of the camera it is then possible to calculate (or pre-calculate and then reference) the change in distance from the camera based on the change in size of the hand. Advantageously, because the hand gesture is specifically the same for the duration of the pick-up and drop-off process, reliable size comparisons can be made.

Based on the position of the user's hands in the captured video and the relative size and/or stereoscopically determined distance of the user's hands, together with the known position of the book, it is then possible to determine the distance between the virtual object and the surface of the book below the virtual object in 3D space, and animate the object dropping down onto the book accordingly.

It will be appreciated that whilst the present invention is described above using two hands coming together, the same principle can be applied to two digits (e.g. thumb and forefinger) coming together in a pinching action above the virtual object. This may be applicable for example if the camera was to be placed very close to the book, or if the camera was of a high resolution. Hence as noted previously, the control objects used can be the user's hands, or portions of a hand or hands.

In this case, the area copied to the buffer may be referenced with respect to the fingertips that are being pinched together, so that a consistent subset of the user's hand in the image is copied to the buffer for optical flow analysis. Detecting separation of the fingers to initiate dropping of the character is similar to detecting separation of the hands above. The optional graphical effect to visually decouple the virtual object from the fingers may be made appropriate to how the object is being picked up; for example it may be animated as struggling, or swaying slightly.

Figure 7:
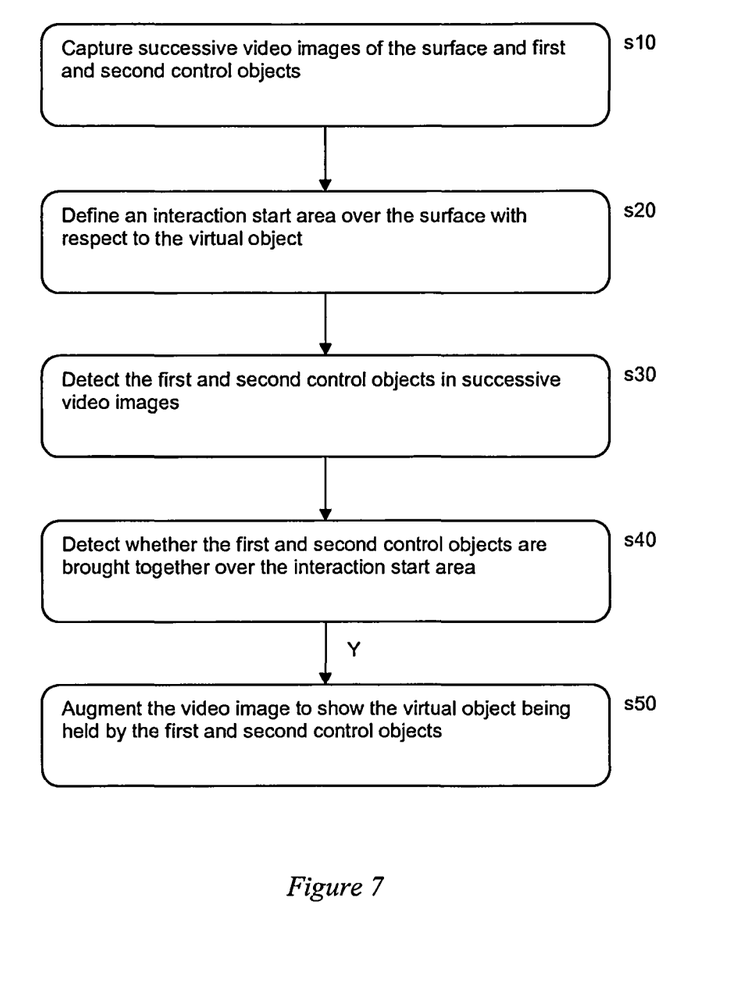
FIG. 7 is a flow diagram of a method of augmented reality interaction according to an embodiment of the present invention.

Hence, and referring now to FIG. 7, in a summary embodiment of the present invention, a method of augmented reality interaction for repositioning a virtual object on an image of a surface 1000 (e.g. the book) comprises in a first step s10 capturing successive video images of the surface and first and second control objects 1012, 1014 (e.g. the user's hands, or two of their digits, or two move controllers). The method then comprises in a second step s20 defining an interaction start area 1022, 1024 over the surface with respect to the virtual object 2010 (i.e. one or more virtual buttons as described above, either centred on the virtual object or at another position relative to it), and in a third step s30 detecting the first and second control objects in successive video images. Then the PS3 continues in a fourth step s40 by detecting whether the first and second control objects are brought together over the interaction start area in the manner described previously, and if so, in a fifth step s50 it augments the video image to show the virtual object being held by the first and second control objects, for example as shown in FIG. 6.

In an instance of the summary embodiment, the step of detecting whether the first and second control objects are brought together over the interaction start area comprises the step of detecting whether the respective motions of the first and second control objects are substantially toward the centre of the start area, from substantially opposite directions, for example discussed previously in relation to FIG. 4.

More particularly, in this case this step may comprise detecting whether the first and second control objects occupy a threshold amount of a predetermined region at or adjacent to the centre of the start area.

In an instance of the summary embodiment, the step of detecting whether the first and second control objects are brought together over the interaction start area comprises a predetermined tolerance to asymmetry of actions by the first and second control objects with respect to the centre of the start area. For example, as noted above, the first and second control objects may satisfy the motion and/or position criteria described above at slightly different times.

In an instance of the summary embodiment, a region 3010 of successive video images is analysed using optical flow analysis to determine the overall direction of motion of the first and second control objects. As noted previously, typically this region is copied to a dedicated buffer 3000 for the analysis.

More particularly, optionally only motion directions 3030 from sub-regions 3020 of the analysed region 3010, 3000 corresponding to a characteristic of the control object are used to determine the overall direction of motion. Such characteristics include that a threshold number of pixels in a sub-region are identified as skin-pixels (e.g. having a red to green or blue ratio above a threshold level) or identified as depicting the PlayStation Move light-ball (for example by having a colour and optionally a relative brightness indicative of the current state of the Move's light-ball).

Following from this analysis, the step of augmenting the video image to show the virtual object being held by the first and second control objects may comprise the step of superposing a graphical effect on the video image prior to superposition of the virtual object, such that the graphical effect visually disconnects (decouples) the virtual object from the video image in the resulting augmented image. Typically this means that no pixel of the control objects 1012, 1014 immediately adjacent to a pixel of the virtual object 2010 are left substantially un-obscured by the graphical effect in the final augmented image.

In an instance of the summary embodiment, the step of augmenting the video image to show the virtual object being held by the first and second control objects is made subject to a predetermined time limit, after which the virtual object is no longer shown being held by the first and second control objects. Typically at this point the virtual object is either re-set to the starting area or is shown to fall out of the controlling objects' hold.

In an instance of the summary embodiment, where the region 3010 is analysed using optical flow techniques as described above, the overall direction of motion is obtained for sub regions in respective left and right halves of the analysed region (i.e. substantially corresponding to left and right hands, fingers or move controllers in the region of the image), and if the horizontal component of motion between the overall motions of the left and right halves differs by more than a threshold amount (i.e. the hands, fingers or move controllers begin to move apart), then the virtual object is no longer shown being held by the first and second control objects.

In an instance of the summary embodiment, the virtual object is positioned back on the image of the surface responsive to the position of the first and second controllers in the captured video image and also their relative change in size compared to when they were first detected to be brought together.

In an instance of the summary embodiment, the surface is a book 1000; for example the book's front cover, back cover, inside covers, or one or two pages thereof.

In this case, optionally the virtual object represents a narrator of the book, and repositioning the narrator produces a corresponding shift in an audio narration of the book, for example according to the position of the narrator with respect either to text on the augmented page of the book, or the position of the narrator with respect to some other graphical depiction of a narrative path on the book (such as for example a literal path successively passing straw, wood and stone houses of three little pigs).

As noted above, an entertainment device such as the PS3 is a suitable for interacting with a virtual object in an augmented reality environment in this manner, and comprises video input means (710, 720, 730, 740) for receiving successive captured video images of a surface (for example from an EyeToy camera 756) and first and second control objects (for example the user's hands, digits or Move controllers 758). In addition is comprises processing means (e.g. Cell processor 100) operable to define an interaction start area over the surface with respect to the virtual object. The processing means is also operable to detect whether the first and second control objects are brought together over the interaction start area. Finally, an augmentation means (e.g. RSX 200 either operating independently or in co-operation with the Cell processor) is operable to augment the video image to show the virtual object being held by the first and second control objects, in the event that the first and second control objects are detected as being brought together over the interaction start area.

Finally, it will be appreciated that the methods disclosed herein may be carried out on conventional hardware (such as the PS3) suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or in the form of a transmission via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiment of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

I claim:

1. A method of augmented reality interaction for repositioning a virtual object on an image of a surface, the method comprising:
   capturing successive video images of the surface and first and second control objects, the first and second control object being a user's hands, or respective parts of one or both of the user's hands;
   defining an interaction start area over the surface with respect to the virtual object;
   detecting the first and second control objects based upon skin tone pixels in successive video images;
   detecting whether the first and second control objects are brought together over the interaction start area;
   and when it is detected that the first and second control objects are brought together over the interaction start area,
   analysing a region of successive video images using optical flow analysis to determine an overall direction of motion of the first and second control objects; and
   augmenting the video image to show the virtual object being held by the first and second control objects;

and in which
the step of augmenting the video image to show the virtual object being held by the first and second control objects comprises the step of superposing a graphical effect on the video image prior to superposition of the virtual object, such that the graphical effect visually disconnects the virtual object from one or both of the user's hands in the resulting augmented image.

2. A method according to claim 1, in which the step of detecting whether the first and second control objects are brought together over the interaction start area comprises the step of detecting whether the respective motions of the first and second control objects are substantially toward the centre of the start area, from substantially opposite directions.

3. A method according to claim 2 in which the step of detecting whether the first and second control objects are brought together over the interaction start area comprises the step of detecting whether the first and second control objects occupy a threshold amount of a predetermined region at or adjacent to the centre of the start area.

4. A method according to claim 2, in which the step of detecting whether the first and second control objects are brought together over the interaction start area comprises a predetermined tolerance to asymmetry of actions by the first and second control objects with respect to the centre of the start area.

5. A method according to claim 1, in which only motion directions from sub-regions of the analysed region corresponding to a characteristic of the control object are used to determine the overall direction of motion.

6. A method according to claim 1, in which the step of augmenting the video image to show the virtual object being held by the first and second control objects is made subject to a predetermined time limit, after which the virtual object is no longer shown being held by the first and second control objects.

7. A method according to claim 1, in which the overall direction of motion is obtained for sub regions in respective left and right halves of the analysed region, and if the horizontal component of motion between the overall motions of the left and right halves differs by more than a threshold amount, then the virtual object is no longer shown being held by the first and second control objects.

8. A method according to claim 1, comprising the step of:
positioning the virtual object back on the image of the surface responsive to the position of the first and second controllers in the captured video image and also their relative change in size compared to when they were first detected to be brought together.

9. A method according to claim 1, in which the surface is a book.

10. A method according to claim 1, in which the virtual object represents a narrator of the book, and repositioning the narrator produces a corresponding shift in an audio narration of the book.

11. A computer program product embodied on a non-transitory computer readable storage medium storing computer implementable instructions thereon, the instructions, when executed by a computer, implement the steps of:
capturing successive video images of the surface and first and second control objects, the first and second control object being a user's hands, or respective parts of one or both of the user's hands;
defining an interaction start area over the surface with respect to the virtual object;
detecting the first and second control objects based upon skin tone pixels in successive video images;
detecting whether the first and second control objects are brought together over the interaction start area;
and when it is detected that the first and second control objects are brought together over the interaction start area,
analysing a region of successive video images using optical flow analysis to determine an overall direction of motion of the first and second control objects; and
augmenting the video image to show the virtual object being held by the first and second control objects;
and in which
the step of augmenting the video image to show the virtual object being held by the first and second control objects comprises the step of superposing a graphical effect on the video image prior to superposition of the virtual object, such that the graphical effect visually disconnects the virtual object from one or both of the user's hands in the resulting augmented image.

12. An entertainment device for interacting with a virtual object in an augmented reality environment, the device comprising:
video input means for receiving successive captured video images of a surface and first and second control objects, the first and second control object being a user's hands, or respective parts of one or both of the user's hands;
processing means operable to define an interaction start area over the surface with respect to the virtual object;
the processing means being operable to detect whether the first and second control objects are brought together over the interaction start area;
analysis means operable to analyse a region of successive video images using optical flow analysis to determine the overall direction of motion of the first and second control objects; and
augmentation means operable to augment the video image to show the virtual object being held by the first and second control objects, in the event that the first and second control objects are detected as being brought together over the interaction start area,
and in which
the augmentation means is operable to superpose a graphical effect on the video image prior to superposition of the virtual object, such that the graphical effect visually disconnects the virtual object from one or both of the user's hands in the resulting augmented image.

* * * * *